US011860964B2

(12) United States Patent
Burger et al.

(10) Patent No.: US 11,860,964 B2
(45) Date of Patent: Jan. 2, 2024

(54) INDUSTRIAL INFORMATION IDENTIFICATION AND RETRIEVAL SYSTEM

(71) Applicant: ABB Schweiz AG, Baden (CH)

(72) Inventors: Andreas Burger, Weingarten (DE); Heiko Koziolek, Karlsruhe (DE); Sten Gruener, Ilvesheim (DE); Johannes Schmitt, Ladenburg (DE); Marcel Dix, Mannheim (DE)

(73) Assignee: ABB Schweiz AG, Baden (CH)

( * ) Notice: Subject to any disclaimer, the term of this patent is extended or adjusted under 35 U.S.C. 154(b) by 83 days.

(21) Appl. No.: 16/923,110

(22) Filed: Jul. 8, 2020

(65) Prior Publication Data
US 2021/0011968 A1 Jan. 14, 2021

(30) Foreign Application Priority Data

Jul. 9, 2019 (EP) .................... 19185280

(51) Int. Cl.
G06F 16/9538 (2019.01)
G06F 16/951 (2019.01)

(52) U.S. Cl.
CPC ........ *G06F 16/9538* (2019.01); *G06F 16/951* (2019.01)

(58) Field of Classification Search
None
See application file for complete search history.

(56) References Cited

U.S. PATENT DOCUMENTS

| 6,516,312 | B1 | 2/2003 | Kraft et al. |
| 2007/0233664 | A1 | 10/2007 | Hardin et al. |
| 2014/0122475 | A1* | 5/2014 | Li ..................... G06F 16/24578 |
| | | | 707/734 |
| 2016/0275190 | A1* | 9/2016 | Seed ..................... H04W 4/70 |

(Continued)

FOREIGN PATENT DOCUMENTS

WO    WO 200041090 A1    7/2000

OTHER PUBLICATIONS

Iatrou Chris Paul et al: "Efficient OPC 1-15 UA binary encoding considerations for embedded devices", 2016 IEEE 14th International Conference on Industrial Informatics (INDIN), IEEE, Jul. 19, 2016 (Jul. 19, 2016), pp. 1148-1153, XP033044061.

(Continued)

*Primary Examiner* — Amresh Singh
(74) *Attorney, Agent, or Firm* — Leydig, Voit & Mayer, Ltd.

(57) ABSTRACT

An industrial information identification and retrieval system includes: a crawler; a search engine; a result processor; and a web user interface "web UL" The crawler identifies devices and their associated Open Platform Communication Unified Architecture "OPC UA" servers within a network as identified OPC UA servers. The crawler browses the identified OPC UA servers and extracts and stores data items in a database as extracted data items. The search engine searches the extracted data items and provides search results to the result processor. The result processor determines a score for each search result. The web UI presents the search results according to the scores.

16 Claims, 3 Drawing Sheets

(56) References Cited

U.S. PATENT DOCUMENTS

2019/0107827 A1 4/2019 Dhakshinamoorthy et al.
2019/0207957 A1* 7/2019 Espinosa ............. H04L 63/1425

OTHER PUBLICATIONS

Lunardi, Willian T., et al. Context-based search engine for industrial IoT: Discovery, search, selection, and usage of devices. In: Emerging Technologies & Factory Automation (ETFA), 2015 IEEE 20th Conference on. IEEE, 2015. S. 1-8.
Matherly, John. Shodan search engine. Available at [online]: https://www.shodan.io, 2009.
Ostermaier, Benedikt, et al. A real-time search engine for the web of things. Conference: 2010 Internet of Things (IOT), IoT for a green Planet, Tokyo, Japan, Nov. 29-Dec. 1, 2010.

* cited by examiner

INDUSTRIAL INFORMATION IDENTIFICATION AND RETRIEVAL SYSTEM

CROSS-REFERENCE TO PRIOR APPLICATION

Priority is claimed to European Patent Application No. EP 19 185 280.5, filed on Jul. 9, 2019, the entire disclosure of which is hereby incorporated by reference herein.

FIELD

The present invention relates to an industrial information identification and retrieval system and an industrial internet of things search method.

BACKGROUND

The Industrial Internet of Things (IIoT) connects many different devices, from low-cost sensors up to high-end devices. In industrial automation, information models for these sensors and high-end devices are provided via OPC UA servers communicating via the Internet Protocol (IP). To find information, it is necessary to connect to these servers and for example browse for data items manually. The provided information can be crucial for root causes analysis of failures or process insights. Current state of the art: classic OPC servers with limited information models, searching is done on manually specified plant catalogues, such as the 800xA Aspect Directory. This is akin to the situation of web catalogues in the WWW (e.g., Yahoo) before search engines based on web crawlers were invented (e.g., Google).

However, this manual browsing for information needs to be improved.

Therefore, it would be advantageous to have means to browse for and retrieve information for sensors and high-end devices within an industrial automation environment.

SUMMARY

In an embodiment, the present invention provides an industrial information identification and retrieval system, comprising: a crawler; a search engine; a result processor; and a web user interface "web UI", wherein the crawler is configured to identify devices and their associated Open Platform Communication Unified Architecture "OPC UA" servers within a network as identified OPC UA servers, wherein the crawler is configured to browse the identified OPC UA servers and extract and store data items in a database as extracted data items, wherein the search engine is configured to search the extracted data items and provide search results to the result processor, wherein the result processor is configured to determine a score for each search result, and wherein the web UI is configured to present the search results according to the scores.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
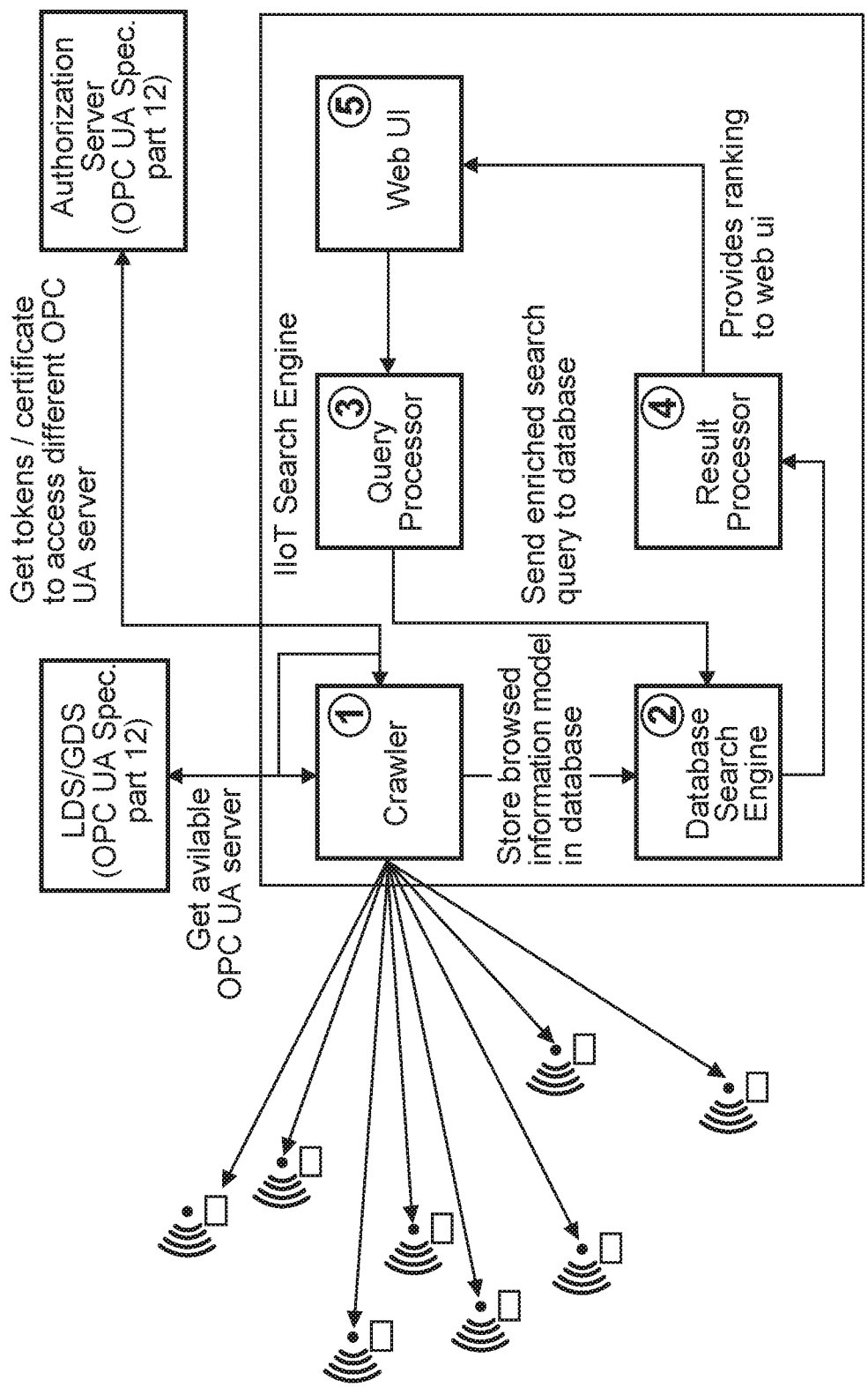
FIG. 1 shows a detailed view of an architecture implementing the industrial information identification and retrieval system and the industrial internet of things search method.

In a first aspect, there is provided an industrial information identification and retrieval system; comprising:
a crawler;
a search engine;
a result processor; and
a web user interface "web UI";

The crawler is configured to identify devices and their associated Open Platform Communication Unified Architecture "OPC UA" servers within a network. The crawler is configured to browse the identified OPC UA servers and extract and store data items in a database. The search engine is configured to search the extracted data items and provide search results to the result processor. The result processor is configured to determine a score for each search result. The web UI is configured to present the search result according to the scores.

In an example, the data items comprises one or more of: device parameter values or output values; image data; image data for specific devices; device information; device information for a specific vendor; devices within a specific geographical area; device type information.

In an example, the system comprises a query processor. The query processor is configured to provide domain knowledge to the system. Provision of the search results by the search engine comprises utilization of the domain knowledge.

In an example, the web UI is configured to provide the query processor with at least one search query. The query processor is configured to modify the at least one search query to generate the domain knowledge. The modification comprises replacing a keyword in the at least one search query with a domain specific key word and/or adding a keyword to the at least one search query.

In an example, the at one search query is input by a user.

In an example, modification of the at least one search query comprises utilization of at least one modification or replacement rule.

In an example, the at least one modification or replacement rule is pre-set or user defined.

In an example, the search engine is configured to determine the number of times each search result was previously selected by different users. Determination of the score for each search result comprises utilization of the number of times each search result was previously selected by different users.

In an example, the search engine is configured to determine a plurality of similarity metrics for each search result. Determination of the score for each search result comprises utilization of the plurality of similarity metrics.

In an example, the data items comprises device parameter values or output values. The search engine is configured to determine a plurality of measures of variability for parameter values or output values for devices. Determination of the score for each search result comprises utilization of the plurality of measures of variability for parameter values or output values for devices.

In an example, the result processor is configured to rank the search results according to the score for each score result.

In a second aspect, there is provided an industrial internet of things search method, comprising:

a) identifying devices and their associated Open Platform Communication Unified Architecture "OPC UA" servers within a network;

b) browsing the identified OPC UA servers and extracting and storing data items in a database;

d) searching the extracted data items and determining search results;

e) determining a score for each search result; and f) presenting the search result according to the scores.

In an example, the method comprises step c) providing domain knowledge to the system, and wherein step d) comprises utilizing the domain knowledge.

In an example, step c) comprises providing at least one search query and modifying the at least one search query to generate the domain knowledge, the modifying comprising replacing a keyword in the at least one search query with a domain specific key word and/or adding a keyword to the at least one search query.

In an example, step e) comprises ranking the search results according to the score for each score result.

Figure 2:
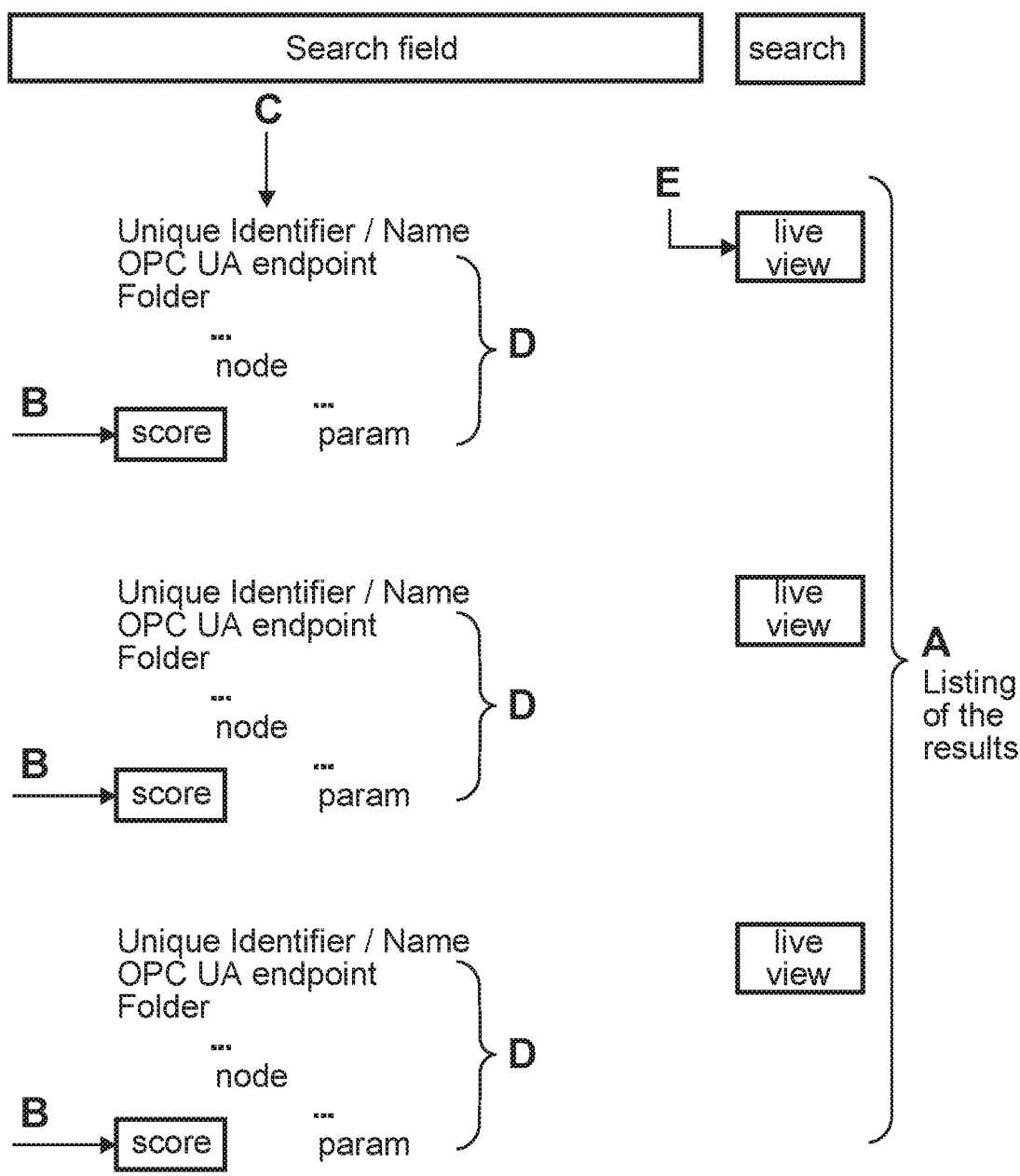
FIG. 2 shows an example of a user interface for displaying search results.
Figure 3:
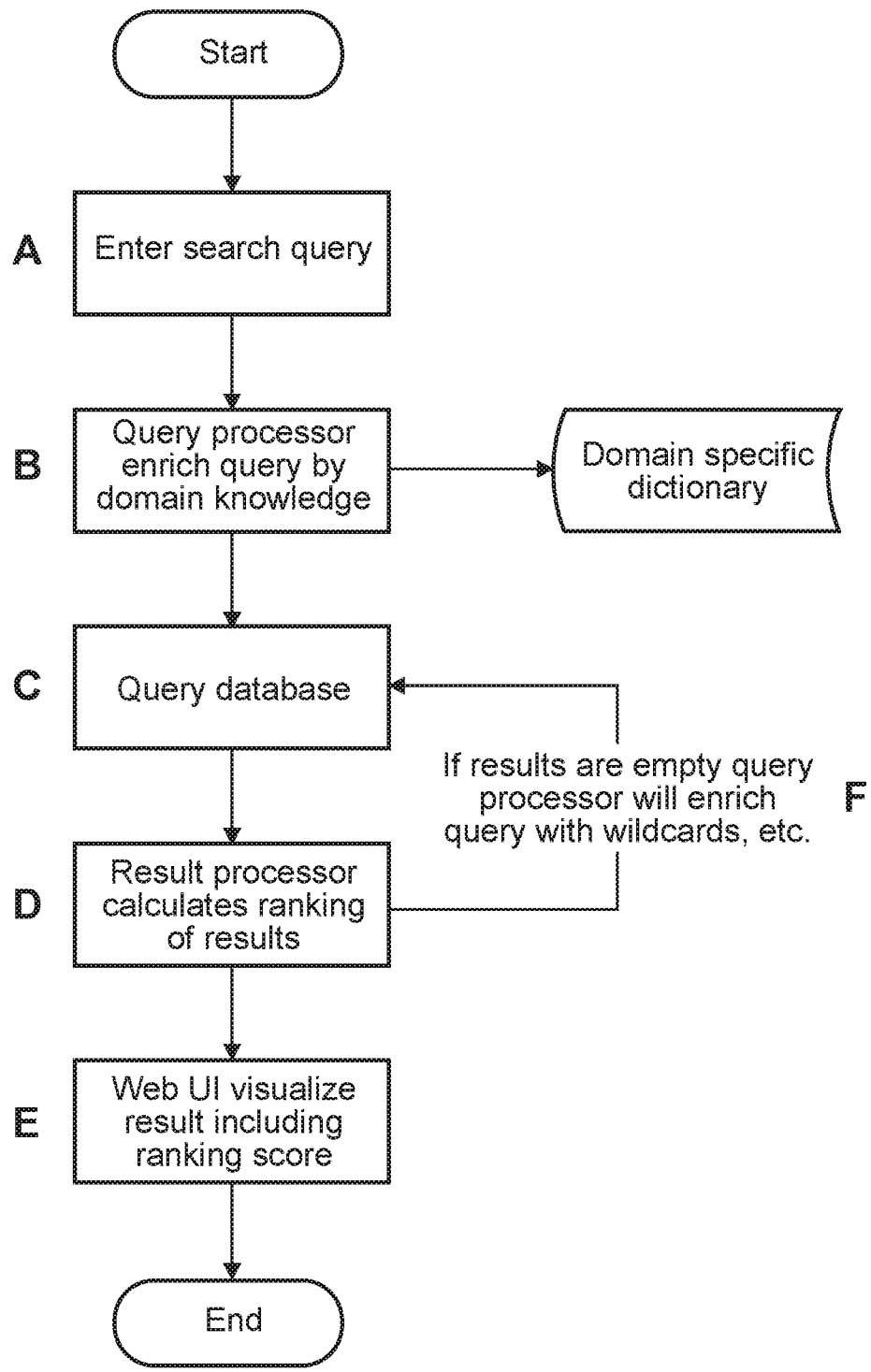
FIG. 3 shows a detailed workflow of operation of the industrial information identification and retrieval system and the industrial internet of things search method.

FIGS. 1-3 relate to an industrial information identification and retrieval system and an industrial internet of things search method. In an example, the industrial information identification and retrieval system comprises a crawler, a search engine, a result processor, and a web user interface "web UI". The crawler is configured to identify devices and their associated Open Platform Communication Unified Architecture "OPC UA" servers within a network. The crawler is configured also to browse the identified OPC UA servers and extract and store data items in a database. The search engine is configured to search the extracted data items and provide search results to the result processor. The result processor is configured to determine a score for each search result. The web UI is configured to present the search result according to the scores.

In an example, the network is a local network or a global network.

In an example, identification of devices and their associated OPC UA comprises utilization by the crawler of an OPC UA local or OPC UA global discovery server or multicast domain name system "mDNS".

In an example, identification of devices and their associated OPC UA comprises utilization by the crawler of references within an OPC UA node to another server.

In an example, the crawler is configured to obtain credentials from an authorization server to connect to the OPC servers.

In an example, the crawler is configured to browse an identified OPC UA server via a client/server connection.

In an example, the crawler is configured to browse an OPC UA server comprising utilization of a depth-first search algorithm or a graph-exploring algorithm.

In an example, the system is configured to pre-process the data stored in the database to provide better integration with the query capabilities of the database.

According to an example, the data items comprises one or more of: device parameter values or output values; image data; image data for specific devices; device information; device information for a specific vendor; devices within a specific geographical area; device type information.

According to an example, the system comprises a query processor. The query processor is configured to provide domain knowledge to the system, and provision of the search results by the search engine comprises utilization of the domain knowledge.

According to an example, the web UI is configured to provide the query processor with at least one search query. The query processor is configured to modify the at least one search query to generate the domain knowledge. The modification comprises replacing a keyword in the at least one search query with a domain specific key word and/or adding a keyword to the at least one search query.

According to an example, the at one search query is input by a user.

According to an example, modification of the at least one search query comprises utilization of at least one modification or replacement rule.

According to an example, the at least one modification or replacement rule is pre-set or user defined.

According to an example, the search engine is configured to determine the number of times each search result was previously selected by different users. Determination of the score for each search result comprises utilization of the number of times each search result was previously selected by different users.

According to an example, the search engine is configured to determine a plurality of similarity metrics for each search result. Determination of the score for each search result comprises utilization of the plurality of similarity metrics.

According to an example, the data items comprises device parameter values or output values. The search engine is configured to determine a plurality of measures of variability for parameter values or output values for devices. Determination of the score for each search result comprises utilization of the plurality of measures of variability for parameter values or output values for devices.

According to an example, the result processor is configured to rank the search results according to the score for each score result.

An example also relates to an industrial internet of things search method. The method comprises:

a) identifying devices and their associated Open Platform Communication Unified Architecture "OPC UA" servers within a network;

b) browsing the identified OPC UA servers and extracting and storing data items in a database;

d) searching the extracted data items and determining search results;

e) determining a score for each search result; and f) presenting the search result according to the scores.

In an example, the network is a local network or a global network.

In an example, step a) comprises utilizing an OPC UA local or OPC UA global discovery server or multicast domain name system "mDNS".

In an example, step a) comprises utilizing references within an OPC UA node to another server.

In an example, step a) comprises obtaining credentials from an authorization server to connect to the OPC servers.

In an example, step b) comprises browsing an identified OPC UA server via a client/server connection.

In an example, step b) comprises utilizing a depth-first search algorithm or a graph-exploring algorithm.

In an example, step b) comprises pre-processing the data stored in the database.

In an example, the data items comprises one or more of: device parameter values or output values; image data; image data for specific devices; device information; device information for a specific vendor; devices within a specific geographical area; device type information.

According to an example, the method comprises step c) providing domain knowledge to the system, and wherein step d) comprises utilizing the domain knowledge.

According to an example, step c) comprises providing at least one search query and modifying the at least one search query to generate the domain knowledge, the modifying comprising replacing a keyword in the at least one search query with a domain specific key word and/or adding a keyword to the at least one search query.

In an example, the at one search query is input by a user.

In an example, modifying the at least one search query comprises utilizing at least one modification or replacement rule.

In an example, the at least one modification or replacement rule is pre-set or user defined.

In an example, step d) comprises determining a number of times each search result was previously selected by different users; and wherein step e) comprises utilizing the number of times each search result was previously selected by different users.

In an example, step d) comprises determining a plurality of similarity metrics for each search result; and wherein step e) comprises utilizing the plurality of similarity metrics.

In an example, the data items comprises device parameter values or output values; and wherein step d) comprises determining a plurality of measures of variability for parameter values or output values for devices; and wherein step e) comprises utilizing the plurality of measures of variability for parameter values or output values for devices.

According to an example, step e) comprises ranking the search results according to the score for each score result.

In other words, a system and method have been developed, which allows a fast and efficient search for the information stored in these OPC UA servers. The system has an independent recurring mechanism for identifying, connecting, and browsing different OPC UA servers. The system stores the collected data in an external database for higher query efficiency. A web frontend enriches user search queries with domain knowledge. It ranks the search results and provides direct access to the respective OPC UA server(s).

To put this another way, powerful OPC UA servers with rich standardized information models are discoverable within the network. A plant index can be automatically created by the proposed Crawler by searching the network and scanning the OPC UA servers. This saves manual efforts for index creation and is more robust in case of dynamically changing plants where devices are added or removed during runtime.

The user is provided with easy access to information stored in an IIoT system or in an industrial network. In this way, expert knowledge is no longer necessary for searching for specific data items within the structured information models. To enable the search to become practicable, system boundaries can for example be set based on network segments (local area, defined number of maximum hops/gateways, etc.) or based on the plant hierarchy, e.g., see ISA-106: plant unit, area, plant, site enterprise. Another possibility is for a consortium of companies to set boundaries to specific sites of the consortium.

According to the proposed NAMUR open architecture, Industry 4.0, and the IIoT there will be many new and cheap automation devices (e.g., sensors and actuators) within a plant, which are not directly integrated in the control system but have IP-connectivity. A large number of them will have an OPC UA server providing their data within an information model. Nevertheless, these devices provide useful information for identifying the root cause for an error/event and might help to improve processes etc.

Currently no proper solution exists to quickly search through these information models and make the required information accessible. Nowadays it would be necessary to go through all servers manually and try to find the requested information. This includes connecting to all different devices by knowing their OPC UA endpoint, use some additional software and browse the information model manually. Some of these sensors might not follow a standardized information model so that expert knowledge would be necessary for identifying certain information. Moreover, there is no guarantee for success and completeness of manually found the information. Furthermore, in many cases these devices are very constrained in their hardware. Hence, it can be presumed that such a manual browse cost more time due to the longer response time of the device. Nevertheless, there exist several cases in that it is necessary to connect to those devices and search for specific information, e.g.:

Case 1: search for specific parameters such as a temperature value in a specific perimeter around you and analyze the situation in a comprehensive way by incorporating all temperature values around this specific position and for example with a certain threshold. The search arguments can be "temperature property", "current GPS coordinates", and "desired perimeter, e.g., radius of 50 m". The search engine can retrieve all devices in the perimeter by using their specified GPS coordinates and the current GPS coordinates. It can then check for all devices whether they contain a "temperature property". These devices can be listed as search result.

Case 2: image search for all specific devices within a plant to enable field personal to visually match and find devices in proximity. The search itself can use a text string as search argument. The search engine can retrieve for each device matching the search argument an image stored in the OPC UA server. Then it can display these images to the user in the same manner as the Google image search. The user in the field standing in front of a particular device could try to match the device with the images from the search result.

Case 3: search for devices of a specific vendor.

Case 4: free text search to search for information stored and provided in the information model of the OPC UA server. An information model is assumed to be a populated OPC UA address space (an example is shown on this web page:http://www.commsvr.com/OPC-Help/media/ASMD-BoilerModelDiagram.jpg). It is a graph of connected data elements. An OPC UA address space for an individual device for example may contain data elements for the device name, type, manufacture, serial number, communication protocols, as well as dynamically changing data elements, e.g., for sensor values or alarms. For example, a user could search for all "Siemens" devices within a plant segment to plan maintenance activities.

Case 5: a search of devices within a specific geographical-range e.g. a certain number of meters around a specific location Case 6: search for devices of a specific type or implementing a certain typed function The system and method described here addresses issues relating to identifying and retrieving such information, providing a central system allowing to perform these use cases.

Information is provided in way so that it is searchable and easily accessible. The system and method interprets references, combines information stored in different nodes and/or enriches the search by semantic knowledge. Interpreting references can for example refer to deriving devices types from tag names. A reference can be a tag name or device designation in this case. For example, the user searches for "LIT100" and the search engine can infer that a device of type "Level Indicator Transmitter" is meant and broaden the search to all devices of this type. Combining information from different nodes in the information model is for example required when doing a proximity search and using both the device name and the device GPS coordinates to come up with the search result.

The search and the application of the search results can be embedded to applications—e.g. within a configuration tool to simplify the setup of an information flow by providing an integrated search for all devices of a certain type that provide the required input parameter.

In more detail, the above problems are addressed through a developed system called IIoT Search Engine. This consists of five different components: the Crawler, the Search Engine, the Result Processor, the Query Processor, and the Web UI. The crawler component is responsible for identifying different devices and their OPC UA server within the network (local or global). Therefore, this component uses a discovery technique, like (OPC UA local/global discovery server or mDNS) or follow the references within an OPC UA node to another server. The crawler gets credentials to connect to these OPC UA servers from the authorization server and starts browsing the identified OPC UA server via Client/Server connection. A depth-first-search algorithm or a similar graph-exploring algorithm following references realizes the browse process. After the browse process, the crawler stores the extracted data items into a database. When the data is stored in the database it be can be preprocessed to provide a better integration with the query capabilities of the database (e.g. flatten the structure or de-normalize the data).

The search engine component is realized by a COTS database and some extension to process the raw data provided by the crawler component. This database can be queried by the query processor component. This component takes queries from the Web UI component and can make use of a dictionary approach for enriching it with domain knowledge, e.g. replacing or adding domain specific keywords.

The COTS database can for example be that provided by Apache Lucene (https://lucene.apache.org/) using the Elasticsearch search engine (https://en.wikipedia.org/wiki/Elasticsearch). The extensions referred to above are algorithms used to process the OPC UA address space serializations and convert them to the formats required by Elasticsearch.

Predefined "replacement lists" can be used for the search enrichment. For instance, a keyword "sensor" in the query can be replaced by several product types that tend to occur within OPC UA devices such as "sensor OR TTH100 OR TTL100 OR TTH300 OR . . . ". This replacement, which can also be an addition helps to make the query more likely to match. These replacement rules can be either shipped with the search engine, or be additionally defined by the user, and in this the "dictionary" as referred to above.

The query is forwarded to the search engine and the search results are transferred to the result processor. The result processor handles the search-results to generate the result set that shall be send back to the web UI. This processing includes filtering out of database specific aspects, aggregation of results, and ranking of the search results. The ranking of the search results can be made based on textual similarities, number of occurrences, and number of clicks or semantic matchmaking. Thus, the search engine records how many times a particular result item from the list of results was clicked by different users.

For the number of usages, the result processor tracks the clicks of the searched results. In order to provide a useful ranking result, the result processor scores each search result with a combination of similarity metrics and the access history of the particular OPC UA server from the search engine. Additionally, the ranking can be improved by ranking search results higher, where the values for certain variables change more often. Due to that, variables, which are changing often, can be ranked higher than other node values. Similarity metrics can here refer for example to fuzzy matching of textual search strings: https://en.wikipedia.org/wiki/Approximate_string_matching Access history can for example refer to the number of clicks for the particular OPC UA server, which can include weighting recent clicks higher.

The semantic matchmaking is a special aspect that can be used in the context of information models as used in OPC UA. Each element modeled in the information model can be integrated with other elements in the information model using references between elements. The meaning of such reference can describe relationships or semantics like "is located in", "is connected to" or "is implementing function described in". In contrast to typical search queries, where the raw-data of the dataset is processed (e.g. using a keyword search), a semantic matchmaking requires to consider and evaluate the meaning of the content. This means semantic matchmaking takes aspects like types or relationships between data sets into account. This is useful for search requests that combine aspects that are not covered within one entry of the database: "give all device-instances of type X" or "all devices connected to controller X".

The web UI component present the results accordingly to the score and provide a collapsed condensed tree structure to show the relative position of a found node as well as a timestamp indicating the last browse process for this server.

Continuing with the figures, FIG. 1 provides an overall view of a specific implementation of the system and method, where for example a more general discovery mechanism than LDS/GDS can be utilized. The components of the system includes at least one crawler (1) which connects to the different OPC UA servers to browse their information models (including contained parameters, geo-coordinates, historical data, files, thrown Events/Alarms). This can be combined with additional meta-data about the OPC UA server—e.g. the physical location, IP address, etc. It has at least one Search Engine (2), which provides an indexed and searchable storage for the browsed information model. To support the aforementioned semantic matchmaking, a database that supports the representation of relationships between elements together with a search engine that can be used to evaluate these relationships can be very beneficial. Thus, for example the concept of RDF based data representation and the usage of triple-DBs can be used to evaluate types and inheritance-relationships within search request using the query language SparQL.

Specific reference information can be reviewed as follows:
RDF: https://en.wikipedia.org/wiki/Resource_Description_Framework
Triple-DB: https://en.wikipedia.org/wiki/Triplestore
SPARQL: https://en.wikipedia.org/wiki/SPARQL Constructing SPARQL queries: https://medium.com/wallscope/constructing-sparql-queries-ca63b8b9ac02

To consume user requests, or search queries such as for example a user types in "level sensor" as a search argument, the system includes a Query Processor (3) which uses internally a domain-specific dictionary to enrich and to refine the user query with domain knowledge. The Search Engine transfers the result to the Result Processor (4). The Result Processor creates the ranking by calculating a score and sorting the result items.

FIG. 2 illustrates a user interface for displaying search results that may be used to present the results of the IIoT Search Engine. A first area 201 provides a listing of the results. This listing includes a unique identifier/name for each search result as well as the OPC UA endpoint 203 and a condensed view of the information model tree structure 204. The unique identifier/name can be generated based on the OPC UA server contents. It highlights the nodes or parameter that are part of the search result. Once 203 is clicked a full tree of the OPC UA server to the highlighted nodes or parameter will be shown. Each search result has a URL link 205 for connecting directly to the OPC UA endpoint and get a live view of the information model and the highlighted values. The score level 202 provides the user an indication of how the results were ordered.

The flowchart of FIG. 3 shows the general steps for using the search engine, within an industrial internet of things search method. After entering the query 301 and starting the search process, the query processor can analyze and enrich the query if necessary with domain knowledge 302. The next step can be querying the database 303 in the appropriate format and with the enriched query. The database can produce a first intermediate search result, which is passed to the result processor 304. The result processor can calculate for each result item a score. The calculated ordering is passed to the web UI 305, which presents the results, possibly overlay to indoor maps or outdoor sitemaps.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An industrial information identification and retrieval system, comprising:
    a crawler configured to:
        identify devices and their associated Open Platform Communication Unified Architecture "OPC UA" servers within a network as identified OPC UA servers, the network comprising boundaries set based on network segments, plant hierarchy, or specific sites;
        create a plant index by searching the network and scanning the identified OPC UA servers; and
        browse the identified OPC UA servers and extract and store data items in an external database as extracted data items,
            wherein the data items comprise one or more of: image data and image data for specific devices; and
            wherein the data items comprise device parameter values or output values;
    a search engine configured to:
        search the extracted data items and provide search results to the result processor;
        interpret references; and
        determine a number of times each search result was previously selected by different users, a plurality of similarity metrics for each search result, and a plurality of measures of variability for parameter values or output values for devices, wherein the plurality of measures of variability is based on frequency of changes to the parameter value or output value;
    a result processor configured to determine a score for each search result by utilization of the number of times each search result was previously selected by different users, the plurality of similarity metrics, and the plurality of measures of variability for parameter values or output values for devices, wherein the plurality of measures of variability is utilized to increase the score of the each search results, where the parameter value or output value changes at a higher frequency than other node values; and
    a web user interface "web UI" configured to present the search results according to the scores.

2. The system according to claim 1, further comprising a query processor,
    wherein the query processor is configured to provide domain knowledge to the system, and
    wherein provision of the search results by the search engine comprises utilization of the domain knowledge.

3. The system according to claim 2, wherein the web UI is configured to provide the query processor with at least one search query, and
    wherein the query processor is configured to modify the at least one search query to generate the domain knowledge, the modification comprising replacing a keyword in the at least one search query with a domain specific key word and/or adding a keyword to the at least one search query.

4. The system according to claim 3, wherein the at least one search query is input by a user.

5. The system according to claim 3, wherein modification of the at least one search query comprises utilization of at least one modification or replacement rule.

6. The system according to claim 5, wherein the at least one modification or replacement rule is pre-set or user defined.

7. The system according to claim 1, wherein the search engine is configured to determine a number of times each search result was previously selected by different users, and
wherein determination of the score for each search result comprises utilization of the number of times each search result was previously selected by different users.

8. The system according to claim 1, wherein the search engine is configured to determine a plurality of similarity metrics for each search result, and
wherein determination of the score for each search result comprises utilization of the plurality of similarity metrics.

9. The system according to claim 1, wherein the data items comprise device parameter values or output values,
wherein the search engine is configured to determine a plurality of measures of variability for parameter values or output values for devices, and
wherein determination of the score for each search result comprises utilization of the plurality of measures of variability for parameter values or output values for devices.

10. The system according to claim 1, wherein the result processor is configured to rank the search results according to the score for each score result.

11. The system according to claim 1, wherein the data items further comprise devices within a specific geographical area.

12. An industrial internet of things search method, comprising:
a) identifying, using a crawler, devices and their associated Open Platform Communication Unified Architecture "OPC UA" servers within a network as identified OPC UA servers, the network comprising boundaries set based on network segments, plant hierarchy, or specific sites;
b) creating, using the crawler, a plant index by searching the network and scanning the identified OPC US servers;
c) browsing, using the crawler, the identified OPC UA servers and extracting and storing data items in an external database as extracted data items,
wherein the data items comprise one or more of: image data and image data for specific devices; and
wherein the data items comprise device parameter values or output values;
e) searching, using a search engine, the extracted data items and determining search results;
interpret references; and
wherein the search engine is configured to determine a number of times each search result was previously selected by different users, a plurality of similarity metrics for each search result, and a plurality of measures of variability for parameter values or output values for devices, wherein the plurality of measures of variability is based on frequency of changes to the parameter value or output value;
f) determining, using a result processor, a score for each search result by utilization of the number of times each search result was previously selected by different users, the plurality of similarity metrics, and the plurality of measures of variability for parameter values or output values for devices, wherein the plurality of measures of variability is utilized to increase the score of the each search results, where the parameter value or output value changes at a higher frequency than other node values; and
g) presenting, using a web user interface the search results according to the scores.

13. The method according to claim 12, further comprising:
d) providing domain knowledge to the system,
wherein step d) comprises utilizing the domain knowledge.

14. The method according to claim 13, wherein step d) comprises providing at least one search query and modifying the at least one search query to generate the domain knowledge, the modifying comprising replacing a keyword in the at least one search query with a domain specific key word and/or adding a keyword to the at least one search query.

15. The method according to claim 12, wherein step f) comprises ranking the search results according to the score for each score result.

16. The method according to claim 12, wherein the data items further comprise devices within a specific geographical area.

* * * * *